J. ANDERSON.
SPRING WHEEL.
APPLICATION FILED DEC. 27, 1915.
1,240,805.
Patented Sept. 25, 1917.
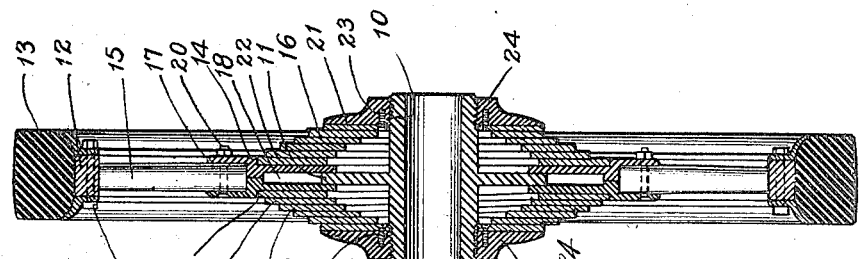
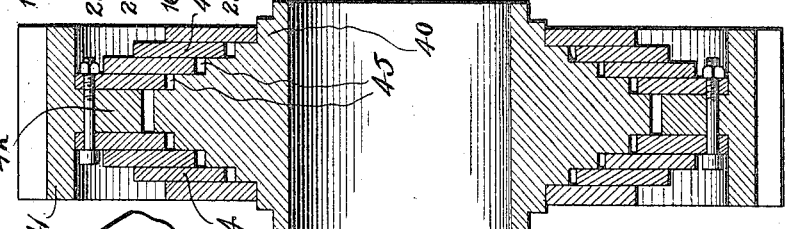
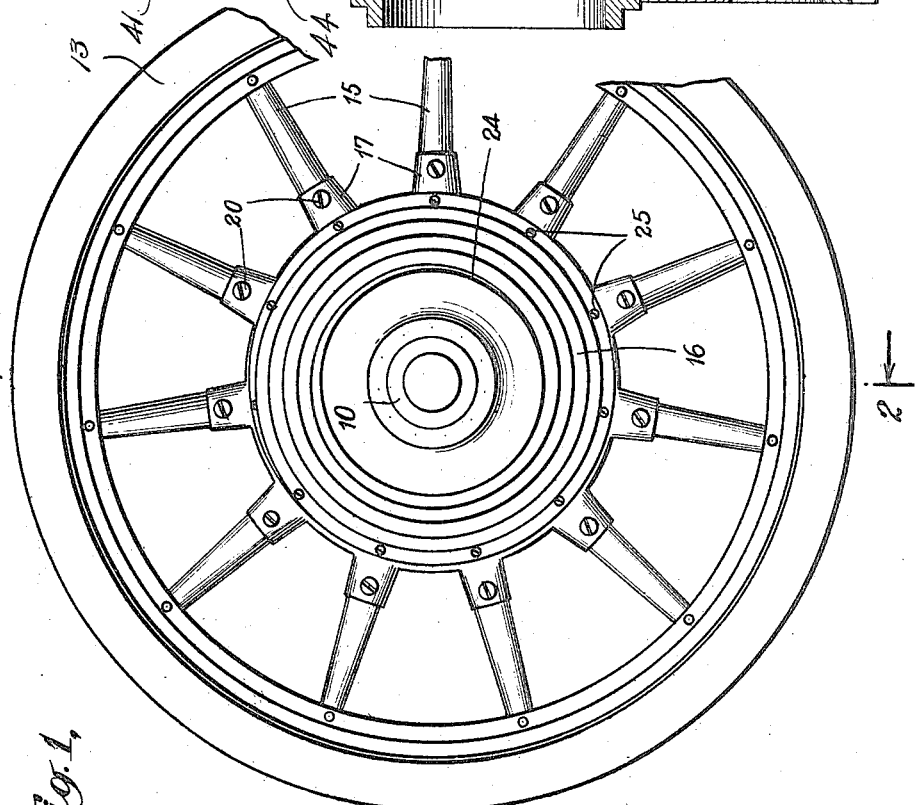
INVENTOR
John Anderson
BY
ATTORNEY

UNITED STATES PATENT OFFICE.

JOHN ANDERSON, OF BLUEFIELD, WEST VIRGINIA, ASSIGNOR OF ONE-HALF TO JOHN W. AUREN, OF EAST LIBERTY, PITTSBURGH, PENNSYLVANIA.

SPRING-WHEEL.

1,240,805.  Specification of Letters Patent.  Patented Sept. 25, 1917.

Application filed December 27, 1915. Serial No. 68,609.

*To all whom it may concern:*

Be it known that I, JOHN ANDERSON, a citizen of the United States, and a resident of Bluefield, Mercer county, and State of West Virginia, have invented certain new and useful Improvements in Spring-Wheels, of which the following is a specification, reference being had to the accompanying drawings, forming a part thereof.

My invention relates to spring wheels and includes gear wheels and the like as well as vehicle or road wheels.

One object of my invention is to provide a resilient wheel that shall be simple and compact in construction and approximately possess the shock-absorbing qualities and the resiliency of a wheel having a pneumatic tire in addition to other advantages as hereinafter pointed out.

Another object is to provide a wheel having hub and rim members and interposed springs, and arranged and constructed so that a limited movement in a radial direction is permitted between the hub and rim members while relative movement between the members in an axial direction is strongly opposed by the action of the interposed spring.

Still another object is to provide a spring particularly adapted for interconnecting the members of a resilient wheel and comprising a plurality of turns which may closely overlap and have a telescoping action whereby the turns support each other and oppose movements in one direction while they permit a relatively free resilient action of the spring in the other direction.

Other objects and advantages of my invention will be set forth hereinafter, and in order that my invention may be thoroughly understood I will now proceed to describe the same in the following specification and then point out the novel features thereof in appended claims.

Referring to the drawings:

Figure 1 is an elevation looking in an axial direction, of a wheel embodying my invention and arranged and constructed in accordance therewith.

Fig. 2 is a sectional elevation taken on the line 2—2 of Fig. 1.

Fig. 3 is a sectional elevation corresponding to Fig. 2, of a gear wheel which constitutes a modification of my invention.

Having special reference to Figs. 1 and 2, the wheel here shown comprises a hub 10 having an annular projection or web 11, a rim 12 on which a tire 13 is mounted, a ring 14, spokes 15, and a pair of springs 16.

The ring 14 is divided into two annular members having radial projections or ears 17 forming sockets for the spokes 15. The annular members of the ring 14 are notched to provide an annular groove or slot 18 which is adapted to receive the web 11 of the hub 10.

The spokes are secured by bolts 19 and 20 or by some other suitable means, to the rim 12 at their outer ends and to the sockets 17 at their inner ends. The springs 16 are similar to each other although they are preferably wound right and left, and each of them comprises a plurality of close turns of edgewise wound resilient strap. The turns vary in size from the outer turn 21 which is fitted onto the hub 10 and to the inner turn 22 which is bolted or otherwise secured to the ring 14. In other words, the spring is of spiral form.

The outer turns of the springs are secured by screws or rivets 23 to nuts 24 which are screwed onto the respective ends of the hub 10 as clearly shown in Fig. 2.

The inner or larger turns 22 are secured to the rings 14 by screws 25.

There is considerable clearance between the edge of the web 11 and the bottom of the slot 18, so that the springs 16 are depended upon for supporting the weight of the axle and whatever bears upon the hub.

It is evident that the spring presents a stepped but continuous or unbroken outer surface and is free from the objections to which most springs are open.

The clearances may, of course, be varied as desired, but I prefer that the relative movement in a radial direction between the hub member and the rim shall be comparatively small.

In the structure hereinbefore described, the springs 16 not only constitute resilient supports for the load but furthermore they introduce a yielding connection for transmitting rotary motion between the hub and the rim. This is particularly advantageous for motor vehicles since it permits the driving motor to start the vehicle with less shock and with the expenditure of less power. Furthermore, it materially reduces the slip of the wheel on the road and increases the life of the tires.

My invention is clearly applicable to other types of wheels such as, for example, a gear wheel, and it is illustrated in this connection in Fig. 3. The arrangement here shown comprises a hub member 40, a ring member 41 having an inwardly extending web or flange 42 and interposed springs 43—44. The springs are similar to the springs 16 of the previous figures. The hub 40 has a stepped outer surface to coöperate with the turns of the springs 43—44. This is for the purpose of precluding a relative movement in an axial direction between the hub and rim and the clearances between the turns of the spring and the steps of the hub, as indicated at 45, are relatively small. Thus, the relative movement permitted in a radial direction between the hub and rim members is slight. This is for the purpose of preventing the gear from jumping out of mesh. However, the spring performs a particularly useful function in relieving the gear of strains due to sudden stopping and starting, since considerable relative rotative movement between the hub and ring is permitted, the spring being wound up to a greater or less degree.

It is obvious that structural modifications may be effected within the spirit and scope of my invention and I intend that only such limitations be imposed as are indicated in the appended claims.

What I claim is:

1. A wheel comprising a hub, a rim, and a pair of spiral springs having close flat turns, one of said members having a web formed to coöperate with the turns of the spiral springs to prevent the axial displacement thereof.

2. A wheel comprising a hub having a plurality of spiral notches forming a stepped web projection which extends outwardly from the hub, a rim having an inwardly extending central web and a pair of spiral springs having close, flat turns, the outer turns of large diameter being secured to the respective sides of the rim web, and the outer turns of small diameter being secured to the hub, the flat, intermediate turns coöperating with the stepped web of the hub, each turn being spaced from the coöperating step of the hub by a small radial clearance.

3. A wheel comprising a hub having spiral notches forming a stepped web projection, a rim having an inwardly extending central web, and a pair of spiral springs having close, flat turns coöperating with the spiral notches of the hub and connecting the hub to the web of the rim.

In witness whereof, I have hereunto set my hand this 11th day of December, 1915.

JOHN ANDERSON.

Copies of this patent may be obtained for five cents each, by addressing the "Commissioner of Patents, Washington, D. C."